United States Patent Office 3,573,231
Patented Mar. 30, 1971

3,573,231
SPARK GAP SEMICONDUCTOR
Bettadapur S. Subramanya, Richmond, Va., and John W. Riddel, Fenton, and Karl Schwartzwaller, Holly, Mich., assignors to General Motors Corporation, Detroit, Mich.
No Drawing. Original application Aug. 16, 1965, Ser. No. 480,182, now Patent No. 3,376,367, dated Apr. 2, 1968. Divided and this application Nov. 13, 1967, Ser. No. 701,497
Int. Cl. H01b 1/06; C04b 35/14
U.S. Cl. 252—516
4 Claims

ABSTRACT OF THE DISCLOSURE

A spark gap semiconductor body consisting of silicon carbide which is bonded with a metal silicate matrix such as aluminum silicate is disclosed.

---

This application is a divisional of applicaton Ser. No. 480,182, filed Aug. 16, 1965.

This invention relates to silicon carbide semiconductors, and more particularly to a silicon carbide semiconductor bonded by a non-conductive metal silicate matrix and the method for making the same.

Silicon carbide is a widely used material in semiconductors for low voltage igniter plugs. As used herein, the term "semiconductor" or equivalent terms refer to a well recognized group of materials which are neither good electrical conductors nor good electrical insulators and have a resistivity in the range of $10^{-3}$ to $10^6$ ohm-cm. at room temperature.

Silicon carbide is widely used because of its property which permits a spark to readily creep along its surface; however, silicon carbide has very poor resistance to spark erosion at elevated temperatures. Many people skilled in the art have added materials to silicon carbide in order to form a semiconductor having improved spark erosion characteristics. The patent to Edwards et al. 3,052,814 describes a silicon nitride-bonded silicon carbide semiconductor. Another example of such a material is described in the patent to White 2,806,005 in which silicon carbide is bonded with a metal oxide such as cobalt oxide, chromium oxide, magnesum oxide, iron oxide, and molybdenum oxide in addition to aluminum oxide. These semiconductors have improved spark erosion and thermal shock properties when compared with silicon carbide; however, these semiconductors and others known in the art still lack adequate spark erosion and thermal shock characteristics.

It is an object of this invention to provide silicon carbide semiconductor bodies having substantially increased spark erosion resistance and substantially increased thermal shock resistance. It is another object of this invention to provide silicon carbide semiconductor bodies having a non-conductive bonding phase material of high strength. It is yet another object of this invention to provide metal silicate-bonded silicon carbide semiconductor bodies. It is still another object of this invention to provide a metal silicate bonded silicon carbide semiconductor bodies having sufficient shrinkage to permit the silicon carbide grains to be in contact with each other. It is a further object of this invention to provide a method for forming metal silicate-bonded silicon carbide semiconductor bodies. It is still a further object of this invention to provide a method for forming metal silicate bonded silicon carbide semiconductor bodies having sufficient shrinkage to permit the silicon carbide grains to be in contact with each other.

These and other objects are accomplished by a process whereby 65 to 85% by weight fine grained silicon carbide is mixed with 15 to 35% by weight of a material which will provide a non-conductive metal silicate matrix durng the subsequent firing step. The resultant mixture is formed into an article of the desired shape and subjected to a heat treatment at a temperature ranging from between 1800° F. to 2400° F. The article is then placed on a bed of silicon carbide grains and covered completely with additional silicon carbide grains. The article, which is embedded in the silicon carbide grains, is fired at a temperature ranging above 2600° F. to yield a semiconductor body in which the silicon carbide grains are in contact with each other and bound together by a non-conductive matrix consisting substantially of a metal silicate. The resultant silicon carbide semiconductor body has superior resistance to spark erosion and thermal shock.

Further objects and advantages of the present inventiin will be more apparent from the following detailed description, reference being had to the following examples wherein the preferred embodiments of the present invention are clearly shown.

In accordance with our invention, silicon carbide semiconductor bodies having superior resistance to spark erosion and thermal shock may be achieved from a raw material batch consisting of from about 65 to 85% silicon carbide, 15 to 35% by weight of a non-conductive metal silicate or a compound which reacts to form a non-conductive metal silicate during the subsequent firing, and 0 to 3% of a fluxing material.

The particle size of the silicon carbide directly affects the erosion characteristics of the semiconductor. It has been observed that for a given semiconductor composition, the resistance to erosion was 500% greater when the commercially available silicon carbide grains were either 400 mesh or 600 mesh in contrast to the same composition wherein the silicon carbide mesh size was 240. The particle size of the 240 mesh silicon carbide ranged from 24 microns up to 90 microns with 90% of the material having a particle size of 67 microns or smaller. The 400 mesh silicon carbide had a particle size range of from 6 microns to 56 microns with 90% of the material having a particle size of 34 microns or less. The 600 mesh silicon carbide had a particle size range of from 4 to 40 microns with 90% of the material having the particle size of 22 microns or less. Silicon carbide having an 800 mesh particle size also worked well, and that material had a particle size range of from 2 microns to 35 microns with the 90% of the material having a particle size of 18 microns or less. Hence, the particle size of the silicon carbide used in the composition is important in obtaining a semiconductor having a high resistance to erosion. Commercially available silicon carbide having a mesh size of 600 was employed in the preferred embodiment.

The second material employed in the ceramic mixture is a metal silicate and/or a compound which will react during the subsequent firing step to form a metal silicate. Examples of metal silicates employed in this invention are aluminum silicate, zirconium silicate, magnesium silicate, beryllium silicate, lanthanum silicate, and yttrium silicate. Compounds which react in the presence of silicon carbide at an elevated temperature to yield the corresponding metal silicate and are employed in this invention are aluminum oxide, zirconium oxide, magnesium oxide, beryllium oxide, lanthanum oxide, yttrium oxide, calcium oxide, strontium oxide and barium oxide. Aluminum oxide was used in the preferred embodiment to form a matrix consisting primarily of aluminum silicate.

The bonding matrix for the silicon carbide grains consists substantially of metal silicates. This matrix provides a high degree of strength for the semiconductor article. In addition to providing strength it also provides resistance to spark erosion at elevated temperatures thereby overcoming the primary shortcoming of silicon carbide. The metal silicates also have the advantages of providing superior thermal shock properties for the semiconductor article. One of the primary reasons for the ability of this semiconductor article to withstand thermal shock is the fact that the coefficient of thermal expansion for metal silicates and silicon carbide are very similar. The coefficient of thermal expansion values given in "Handbook of Thermal Physical Properties of Solid Materials," and other references indicate that the thermal expansion of silicon carbide is 4.5 to $5.2 \times 10^{-6}/°$ C. The values for aluminum silicate, zirconium silicate, and yttrium silicate are $5.0 \times 10^{-6}$, $4.6 \times 10^{-6}$ and $4.3 \times 10^{-6}$ respectively. Since the coefficient of thermal expansion for these materials are similar, internal stresses in the semiconductor article brought about by temperature changes are at a minimum.

The particle size of the metal silicate or of the metal oxide used to form the metal silicate matrix bond is not critical although a fine particle size is generally preferred over a coarse particle size due to the ease of dispersing the compound evenly throughout the silicon carbide. The particle size used in the preferred embodiment was 400 mesh.

A fluxing material can be added to lower the sintering temperature of the metal silicate or the metal oxide. The method of forming this semiconductor is limited to a temperature less than 3150° F. when silicon dioxide is present at 3150° F., a slightly higher temperature than the temperature of 3110° F. at which silicon dioxide ($SiO_2$) melts, because it is undesirable to have liquid silicon dioxide in contact with the silicon carbide. In cases where the metal silicate or the metal oxide used would not sinter at a temperature below 3150° F. and silicon dioxide is present at 3150° F., then it is necessary to add a fluxing material. Fluxing materials that are used satisfactorily in this invention are talc, kaolin, strontium carbonate, beryllium oxide, magnesium oxide, calcium oxide, strontium oxide and barium oxide.

The mixture containing the materials described above and the alumina grinding balls used in a subsequent milling operation are dried in an oven at 110° F. for one hour. The dried material and alumina grinding balls are then placed in a ball mill and milled for four hours.

Following the milling operation, the material is separated from the mill and the grinding balls and thereafter mixed with an organic binder, such as a volatilizable wax emulsion. The wax material merely acts as a binder for facilitating handling and as a lubricant in subsequent die pressing operations. Typically, 2 parts by weight of the milled material are mixed with one part of a wax solution where the wax solution contains 20% wax emulsion, 40% methyl alcohol and 40% distilled water. Other organic materials may be used as the binder such as oils capable of being volatilized at temperatures about 1000° F. The resulting mixture is then dried. a temperature of about 100° C. having been found to be suitable, to remove all water and alcohol present in the emulsion. The dried material is then granulated by gently forcing through a 28 mesh screen. The material is then redried for one hour at 100° C. and stored in an air tight container to avoid change in the moisture content until ready to be formed into articles of the desired shape.

The dry, powdery material is loaded into a steel die for forming into a body having the desired shape. Dense semiconductor bodies suitable for creep gap members in low voltage igniters are formed by application of from about 30,000 to 50,000 p.s.i. to sufficient material in the steel die to form a body of the desired thickness. Bodies having a maximum density have been achieved by using a pressure of about 50,000 p.s.i. The resulting preforms obtained from the pressing operation may be machined if necessary at this time or following the subsequent heat treatment.

The preforms are then subjected to a heating step in an air atmosphere in order to oxidize a limited quantity of the silicon carbide to $SiO_2$ and to improve the spark erosion resistance of the preform. This controlled oxidization step results in a specific amount of $SiO_2$ being dispersed throughout the article. This $SiO_2$ which is dispersed throughout the preform is available to react during the firing step with a metal oxide to form a metal silicate. For example, when the preform contains aluminum oxide, it reacts during the firing step with the $SiO_2$ to form aluminum silicate. This heating step, as a consequence, is essential when the preform contains a metal oxide in order to provide the necessary $SiO_2$ to react with the metal oxide to form the metal silicate. This step is not essential when the preform contains a metal silicate. However, it has been observed in a number of cases that when a preform containing a metal silicate is subjected to the heating step, the spark erosion resistance of the body has been increased. This heating step then is essential when a metal oxide is used in the preform and optional when a metal silicate is used in the preform.

Specifically, the preforms are loaded into an oven and the temperature is raised from room temperature to 2000° F. over a 3½ hour period and held for ½ hour at 2000° F. At that time, the article is removed from the furnace. The temperature of this heating step may vary from 1800° F. to 2400° F. Heat treatments below 1800° F. do not increase the spark erosion resistance of the semiconductor. Temperatures above 2400° F. are to be avoided because the materials tend to be oxidized excessively and react with one another.

It has been observed that a heating treatment between 1800° F. and 2400° F. increases the shrinkage obtained in the subsequent firing step. In the case of aluminum oxide, the shrinkage of the preform diameter at a temperature between 1800° F. and 2000° F. was 1.85% whereas a heat treatment at 2400° F. resulted in the diameter of the preform shrinking 6.9%. Semiconductor bodies with high spark erosion resistance have shrinkage values between 1 and 5% with the preferred range being between 1.4 to 2.4%. The proper heat treatment temperature would vary for each metal oxide and/or metal silicate and should be determined experimentally. In the case of alumina, 2000° F. was the preferred temperature for the heat treatment. The prefiring treatment increases the spark erosion resistance of the semiconductor by increasing the strength of the bonding phase.

The firing step is a controlled reaction in which the sintered metal silicate matrix which holds the silicon carbide grains is formed. In the case when the semiconductor preform contains a metal silicate, the metal silicate is sintered to form the matrix. When the preform contains a metal oxide, the metal oxide reacts with the $SiO_2$ present in the semiconductor to form a metal silicate matrix. Specifically, the firing step is carried out with the article completely surrounded on all sides by a bed of silicon carbide grains. The bed is formed by placing a ½ inch layer of silicon carbide grains on the bottom of an alumina refractory crucible. The article is then placed on top of the silicon carbide layer and sufficient silicon carbide grains are then poured over the article to completely cover the article to a depth of one inch. The crucible containing the article embedded in the silicon carbide grains is inserted into a continuous tunnel kiln having a 24 hour firing and cooling cycle. The article is heated during the cycle at a maximum temperature of 3050° F. for one hour in the case of alumina. After the crucible is cooled, the article is removed by breaking a hardened shell surrounding the article with a hammer. This shell was formed from a portion of the silicon carbide used for bedding purposes. Once the hardened shell has been removed, any remaining loosely adherring silicon carbide remaining from the bedding material is removed from the article by means of a wire brush or cloth buffer. The temperature range for this firing step is 2600° F. to 3150° F. when silicon dioxide is present at 3150° F. The maximum temperature for this firing step when no silicon dioxide is present at 3150° F. is the decomposition temperature of the metal silicate.

The use of a silicon carbide bed is an essential part of this invention. The silicon carbide bed reduces the oxidation of silicon carbide to $SiO_2$ during the firing step to a level sufficiently low so as not to interfere with the forming of a sintered metal silicate matrix. By keeping the formation of the $SiO_2$ during the firing step to a minimal level and by providing a controlled atmosphere, the bed effectively controls the reaction between the metal oxide and the $SiO_2$ which had been formed in the preform during the prefiring heat treatment. This reaction is violent between 2600° F. and 3150° F. in an air atmosphere. In the case of alumina, the reaction between $SiO_2$ and $Al_2O_3$ in an air atmosphere begins at 2400° F. and the reaction rate increases as the temperature is increased so that at temperatures at 2700° F. and above, the reaction becomes very violent. The presence of the silicon carbide grain bed prevents this violent reaction from occurring, the violent reaction being deleterious to the formation of a semiconductor body having a high resistance to spark erosion. In addition, by preventing excessive oxidation of the silicon carbide, growth in the size of the semiconductor body due to the $SiO_2$ is not a problem. Normally, excessive oxidation of the silicon carbide body in an air atmosphere results in a growth of the semiconductor body due to the presence of $SiO_2$. Moreover, the silicon carbide bed by providing a controlled atmosphere also inhibits the oxygen from reacting in the interior of the semiconductor body to the same extent that it reacts with the outer surface or outer region of the semiconductor.

It has been observed that the semiconductor body obtained by this process has a weight increase in the order of 10 weight percent. It is believed that this weight increase is due to the silicon dioxide that is formed in the semiconductor body by controlled oxidation and to the formation of silicon carbide having a cubic crystalline structure which is formed primarily at the outer surface of the semiconductor body and to a lesser amount in the interior of the body. It is believed that the bedding material provides an atmosphere which in turn forms the cubic crystalline silicon carbide on the outer surface of the body. The formation of cubic silicon carbide crystalline structure at the surface of the material is highly desirable because the cubic crystalline material has a higher conductivity than the hexagonal crystalline silicon carbide obtained commercially, and out of which the semiconductor was formed. Therefore, the semiconductor bodies formed by this process have primarily hexagonal silicon carbide throughout and some cubic crystalline silicon carbide grains of higher conductivity on the surface of the body. It has also been observed that the concentration of the metal silicate on the surface of the semiconductor body is lower than it is in the rest of the semiconductor body. Therefore, the presence of the cubic crystalline carbide grains of higher conductivity and the lower concentration of the metal silicate matrix on the surface of the semiconductor body contribute to ease of sparking on the surface of the body. These two factors combine to cause the semiconductor body formed by this process to have a tendency to spark at the surface of the body rather than throughout the body as is the case with the prior art silicon carbide semiconductor bodies.

Another beneficial effect noted is that the silicon carbide grains are not coated with a heavy $SiO_2$ layer which acts as an insulative barrier and prevents the spark from creeping along the silicon carbide. In addition, the bedding step is very important in that under such conditions the article shrinks to a higher degree than if the same article were fired in an air atmosphere. This shrinkage causes the silicon carbide grains to be brought in contact with one another thereby enabling the article to retain the superior semiconductor property of silicon carbide or sparking at a relatively low voltage. Although the invention is believed to function based upon the theory presented, the invention is not limited by this theory.

As will hereinafter appear in the following examples, silicon carbide semiconductor bodies bonded by a nonconductive matrix are obtained which have a high resistance to spark erosion, high thermal shock resistance and a low sparking voltage requirement.

EXAMPLE 1

A 400 gram mixture consisting of 72.5% by weight silicon carbide having a mesh size of 600, 23.9% by weight alumina, 1.1% by weight talc, 1.2% by weight kaolin, 0.3% by weight strontium carbonate and 1% by weight magnesium oxide was mixed in a Waring Blendor. Subsequently, the mixture was ground in a ball mill for 4 hours, blended with a 20% wax solution and then dried. The resultant mixture was pressed into an article of the desired shape, subjected to a preheat treatment at 2000° F. and subsequently fired in a silicon carbide grain bed at 3050° for one hour. The fired semiconductor consists essentially of 64% silicon carbide, 30% aluminum silicate, 2.5% alumina and 3.5% magnesium silicate. It had excellent strength, good spark erosion resistance and good sparking characteristics.

EXAMPLE 2

A mixture consisting of 70% silicon carbide, 27.5% yttrium silicate and 2.5% alumina was treated according to the procedure given in Example 1. The resultant semiconductor had excellent strength, good spark erosion resistance, and good sparking characteristics.

EXAMPLE 3

A mixture consisting of 74% silicon carbide, 19% zirconium silicate and 5% alumina and 2% strontium carbonate was treated according to the procedure given in Example 1. The resultant semiconductor material has excellent strength, good spark erosion resistance and good sparking characteristics.

EXAMPLE 4

A mixture of 75% silicon carbide, 18% aluminum silicate and 5% alumina and 2% magnesium oxide was treated according to the procedure given in Example 1 except that it did not have a preheat treatment. The resultant semiconductor material has excellent strength, good sparking characteristics and good erosion resistance.

The composition of the fired semiconductor body consists of 50 to 85% by weight of the silicon carbide which passes through a 400 mesh screen, 15 to 35% by weight of a metal silicate and 0 to 15% by weight of a metal oxide. The composition of the ceramic starting mixture consists of 60 to 85% by weight of the silicon carbide, 15 to 35% of a material capable of providing a non-conductive metal silicate matrix during the subsequent firing step and 0 to 3% of a fluxing material. The data in the attached table indicates the effectiveness of compounds falling within the ranges specified by this invention.

TABLE

| Compound | Composition of ceramic starting mixture, percent | | | Composition of fired semiconductor body, percent | | | Water test | | Hot bomb test | |
|---|---|---|---|---|---|---|---|---|---|---|
| | SiC4 | Al2O4 | Other | Al2O3 | Al6Si2O13 | SiC4[1] | Average erosion depth, 0.001" | Sparking | Erosion appearance | Sparking |
| B | 82 | 15 | | 2.2 | 17 | 81 | [2] 5 | OK | OK | OK |
| Example No. 1 | 72.5 | 23.9 | | 2.5 | 30 | 67 | 4 | OK | OK | OK |
| C | 60 | 35 | | 11.0 | 35 | 54 | 4 | Missed[2] | OK | Missed[2] |
| Example No. 2 | 70 | 2.5 | | Y2O3SiO2, 27.5 | | | 4 | OK | OK | OK |
| Example No. 3 | 74 | 5.0 | | ZrSiO4, 19.0 | | | 4 | OK | OK | OK |
| Example No. 4 | 75 | 5.0 | | Al6SiO13, 18.0 | | | 3 | OK | OK | OK |

[1] Obtained by difference. [2] Marginal.

The compounds described in the Examples 1 through 4, as well as compounds B and C, are listed and the available data indicates that these compounds passed both the water test and the hot bomb test. Long term field testing in jet igniters confirm the bench test data.

The erosion measured in the water test and the hot bomb test is caused by a spark from a power source of 2,000 volts which is similar to the voltage used in jet igniters. This spark source emits sparks from one electrode at the rate of 120 sparks per minute. The capacitance of the spark source is 8 joules. A piece of the semiconductor body of a specified size is clamped between two electrodes. In the water test, the two electrodes and the semiconductor piece are immersed in water and sparked for two minutes. The semiconductor material is removed from the water and the depth of the erosion is measured in thousandths of an inch. In the hot bomb test, a semiconductor piece of a specified size is again clamped between two electrodes and immersed in a bomb. The bomb is heated to 1000° F. and has a pressure of 100 p.s.i. The semiconductor body is subjected to sparking for 15 hours. The semiconductor body is then removed from the hot bomb and the appearance of the semiconductor is checked for signs of erosion. In both the water test and in the hot bomb test, if a spark fails to travel across the semi-conductor to the other electrode, it is considered a miss which is indicative of a marginal semiconductor. If the sparking stops entirely, it is considered a failure.

While the invention has been described in terms of specific examples, it is understood that the scope of the invention is not limited thereby except as defined in the following claims.

What is claimed is:

1. A spark gap semiconductor body consisting of 50 to 85% by weight silicon carbide, 15 to 35% by weight of a metal silicate and 0 to 15% by weight of a metal oxide, said metal silicate and said metal oxide forming a nonconductive matrix which bonds the said silicon carbide.

2. A semiconductor body as defined in claim 1 wherein the silicate is taken from the group consisting of aluminum silicate, zirconium silicate, magnesium silicate, beryllium silicate, and yttrium silicate.

3. A semiconductor body as defined in claim 1 wherein the metal oxide is taken from the group consisting of aluminum oxide, zirconium oxide, magnesium oxide, beryllium oxide, yttrium oxide, calcium oxide, strontium oxide and barium oxide.

4. A spark gap semiconductor body consisting of 65 to 71% by weight silicon carbide, 23 to 27% by weight aluminum silicate, 1 to 4% by weight aluminum oxide and 1 to 3% by weight magnesium silicate.

References Cited

UNITED STATES PATENTS

| 2,205,308 | 6/1940 | Pirani | 106—44 |
| 2,272,038 | 2/1942 | Morgan | 106—44 |
| 2,816,844 | 12/1957 | Bellamy | 106—44 |
| 2,861,961 | 11/1958 | Harris | 252—516 |
| 3,151,994 | 10/1964 | Adlassnig | 106—44 |

DOUGLAS J. DRUMMOND, Primary Examiner

U.S. Cl. X.R.

252—521; 106—44

PO-1050
(5/69)

UNITED STATES PATENT OFFICE
CERTIFICATE OF CORRECTION

Patent No. 3,573,231     Dated    March 30, 1971

Inventor(s)  Bettadapur S. Subramanya
             John W. Riddel
             Karl Schwartzwalder It is certified that error appears in the above-identified patent and that said Letters Patent are hereby corrected as shown below:

Please correct spelling of inventor Karl Schwartzwall to read  -- Karl Schwartzwalder --.

Column 2, line 11, "durng" should read  -- during --; Col. 2, line 26, "tiin" should read  -- tion --.

Column 3, line 74, the period (.) after the word "dri should be a comma (,).

Column 8, Claims 1 and 4, lines 1, after "consisting" insert  -- essentially --;  at the end of the claims and before the period insert  -- , the electrical properties of said body resulting from the conducting properties of said silicon carbide  --.

Signed and sealed this 17th day of August 1971.

(SEAL)
Attest:

EDWARD M. FLETCHER, JR.        WILLIAM E. SCHUYLER,
Attesting Officer               Commissioner of Paten